(12) United States Patent
Scofield et al.

(10) Patent No.: US 7,747,630 B2
(45) Date of Patent: Jun. 29, 2010

(54) ASSESSING AUTHOR AUTHORITY AND BLOG INFLUENCE

(75) Inventors: Christopher L. Scofield, Seattle, WA (US); Bradley E. Marshall, Bainbridge Island, WA (US); Elmore Eugene Pope, Sammamish, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 316 days.

(21) Appl. No.: 11/536,475

(22) Filed: Sep. 28, 2006

(65) Prior Publication Data

US 2008/0082491 A1    Apr. 3, 2008

(51) Int. Cl.
*G06F 17/30* (2006.01)
*G06F 7/00* (2006.01)

(52) U.S. Cl. .................. 707/748; 707/751; 715/700; 715/738

(58) Field of Classification Search .................. None
See application file for complete search history.

(56) References Cited

U.S. PATENT DOCUMENTS

| | | | | |
|---|---|---|---|---|
| 5,963,205 | A * | 10/1999 | Sotomayor | 715/236 |
| 6,289,342 | B1 * | 9/2001 | Lawrence et al. | 707/7 |
| 7,310,612 | B2 * | 12/2007 | McQueen et al. | 705/26 |
| 2003/0001873 | A1 * | 1/2003 | Garfield et al. | 345/700 |
| 2004/0205079 | A1 * | 10/2004 | Azzam | 707/100 |
| 2004/0236730 | A1 * | 11/2004 | Frank | 707/3 |
| 2006/0007477 | A1 * | 1/2006 | Sekijima | 358/1.15 |
| 2006/0271859 | A1 * | 11/2006 | Gorzela | 715/738 |
| 2007/0038536 | A1 * | 2/2007 | Wise | 705/35 |
| 2007/0118802 | A1 * | 5/2007 | Gerace et al. | 715/738 |

OTHER PUBLICATIONS

International Application No. PCT/US07/79961, International Search Report mailed Jul. 23, 2008, 4 pages.
International Application No. PCT/US07/79961, Written Opinion mailed Jul. 23, 2008, 5 pages.

* cited by examiner

*Primary Examiner*—Cam Y Truong
*Assistant Examiner*—Dung K Chau
(74) *Attorney, Agent, or Firm*—Thomas, Kayden, Horstemeyer & Risley, LLP

(57) ABSTRACT

A facility for determining article influence and author authority based upon cites of the author's articles by other authors is described. Authors post new articles to their blog covering one or more memes, which describe the content of the article. The facility determines other web pages that share the same memes as the articles to form a context set, and then identifies those authors, called stakeholders, that commonly cite posts from web pages within the context set. Stakeholders are those with some knowledge about a particular topic that also write articles on the topic. Articles cited by stakeholders are considered more influential than those that are not cited, and a frequently cited author will have more authority for a given meme than one who is largely ignored, as indicated by receiving few article citations.

22 Claims, 13 Drawing Sheets

| A12 | A21 | A13 | A31 | A14 | A41 | A23 | A32 | A24 | A42 | A34 | A43 |
|---|---|---|---|---|---|---|---|---|---|---|---|
| 1 | 0 | -1 | 1 | | | 0 | 1 | | | | |
| 1 | 0 | -1 | 1 | | | 0 | 1 | | | | |
| 0 | 0 | 0 | 1 | | | 0 | 1 | | | | |
| -1 | 1 | 1 | 1 | | | -1 | 1 | | | | |
| 1 | 0 | -1 | 1 | | | 0 | 1 | | | | |
| 1 | -1 | -1 | 1 | | | -1 | 1 | | | | |
| 1 | 0 | -1 | 1 | | | 0 | 1 | | | | |
| 1 | 1 | -1 | 1 | | | -1 | 1 | | | | |
| 0 | 0 | 0 | 1 | | | 0 | 1 | | | | |
| 1 | -1 | 1 | 1 | | | -1 | 1 | | | | |
| 0 | 0 | 0 | 1 | | | 0 | 1 | | | | |
| 1 | 1 | -1 | 1 | | | -1 | 1 | | | | |
| 1 | 0 | -1 | 1 | | | 0 | 1 | | | | |
| -1 | -1 | -1 | 1 | -1 | 1 | -1 | 1 | -1 | 1 | -1 | 1 |
| 0 | 0 | 0 | 1 | 0 | 1 | 0 | 1 | 0 | 1 | -1 | 1 |
| 1 | -1 | -1 | 1 | -1 | 1 | -1 | 1 | 1 | 1 | -1 | 1 |
| 1 | 0 | 1 | 1 | 1 | 1 | 0 | 1 | 0 | 1 | 1 | 1 |
| -1 | 0 | -1 | 1 | -1 | 1 | 0 | 1 | 0 | 1 | 1 | 1 |
| 1 | -1 | -1 | 1 | -1 | 1 | -1 | 1 | -1 | 1 | 1 | 1 |
| 0 | 0 | 0 | 1 | 0 | 1 | 0 | 1 | 0 | 1 | 1 | 1 |
| 1 | 0 | -1 | 1 | 1 | 1 | 0 | 1 | 0 | 1 | 1 | 1 |
| 0 | 0 | 0 | 1 | 0 | 1 | 0 | 1 | 0 | 1 | 1 | 1 |
| 1 | 0 | -1 | 1 | -1 | 1 | 0 | 1 | 0 | 1 | 1 | 1 |
| 1 | 0 | -1 | 1 | -1 | 1 | 0 | 1 | 0 | 1 | 1 | 1 |
| 0 | -1 | 0 | 1 | 0 | 1 | -1 | 1 | -1 | 1 | 1 | 1 |
| 1 | 0 | 1 | 1 | 1 | 1 | 0 | 1 | 0 | 1 | 1 | 1 |
| 0 | 1 | 0 | 1 | 0 | 1 | -1 | 1 | 1 | 1 | 1 | 1 |
| 1 | 0 | -1 | 1 | 1 | 1 | 0 | 1 | 0 | 1 | 1 | 1 |
| 1 | 0 | -1 | 1 | 1 | 1 | 0 | 1 | 0 | 1 | 1 | 1 |
| 0 | 1 | 0 | 1 | 0 | 1 | -1 | 1 | -1 | 1 | 1 | 1 |
| 1 | 0 | -1 | 1 | 1 | 1 | 0 | 1 | 0 | 1 | 1 | 1 |
| 1 | 0 | -1 | 1 | 1 | 1 | 0 | 1 | 0 | 1 | 1 | 1 |

*FIG. 9*

ASSESSING AUTHOR AUTHORITY AND BLOG INFLUENCE

BACKGROUND

In the past, publishers generally produced written media at significant expense, working with a team of authors and editors to produce content on a particular topic. For example, magazines generally have a well-defined topic and are written by authors that are knowledgeable about the topic, and are edited to ensure the quality of the content. Posting written content through web logs (blogs) on the Internet has reduced the cost of producing and distributing written works to near zero, so that today anyone with a computer and an Internet connection can be a publisher of content. As a result, there has been an explosion in the number of authors producing web logs (blogging), and the number of posts by authors to those blogs.

The dramatic increase in the number of authors and the ease of distribution facilitated by blogging has given rise to a broad range of quality among blogs, as no publisher or team of editors typically reviews blog content. Readers are now faced with the problem of wading through numerous blogs to identify content that is worthwhile to read. Similarly, authors of blogs are interested in rising above the noise generated by the other blog authors. Authors want posts to their blogs to be widely read and carefully considered, particularly where the author has a high level of authority on the topics being written about.

BRIEF DESCRIPTION OF THE DRAWINGS

FIG. 9 is a table illustrating the effect of one author citing another for four example authors.

DETAILED DESCRIPTION

Figure 1:
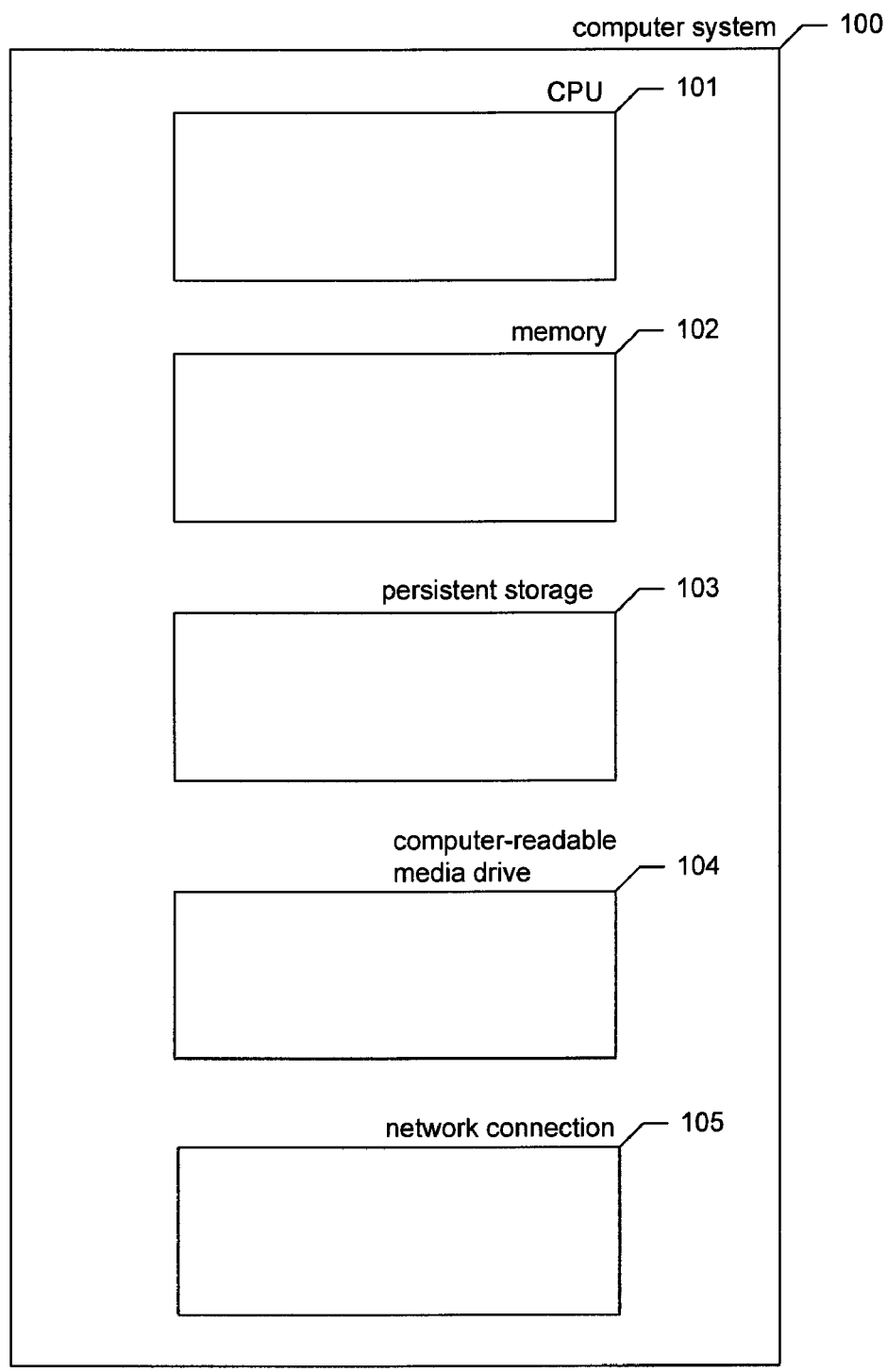
FIG. 1 is a block diagram showing some of the components incorporated in at least some of the computer systems and other devices on which the facility executes.

A facility including a system and method for determining article influence and author authority based upon cites of the author's articles by other authors is described. Authors post new articles to their blog that discuss one or more topics. The topics covered by an article of a blog determine the article's memes, which describe the content of the article. For example, if the author (i.e., a distinguished author) posts an article about skiing, then skiing would be one meme that describes the author's article. The facility determines the memes, for example, by searching for keywords within the article and then determining the memes most often associated with those keywords. As other authors (e.g., authors other than the distinguished author) read the distinguished author's articles, those other authors may write their own articles that cite the distinguished author's article. For example, an author reading the distinguished author's skiing article may agree with the distinguished author's review of a new skiing product and write an article that cites the distinguished author's article and describes a particular aspect of the product in more depth. An author may also cite a distinguished author's article by commenting on the article on the distinguished author's blog. Cited articles are considered more influential than those that are not cited, and a frequently cited author will have more authority for a given meme than one who is largely ignored, as indicated by receiving few article citations. In addition, cites by certain other authors are more relevant than others. For example, a citation from an author that is widely read is more relevant than a citation from an author that is relatively new or rarely cited. In some embodiments, the facility determines other web pages that share the same memes as an article to form a context set, and then identifies those authors, called stakeholders, that commonly cite posts from web pages within the context set. For example, if a distinguished author primarily writes articles about skiing, then other web pages that also contain entries about skiing will be part of the same context set, and authors that have cited web pages about skiing will be stakeholders for the meme of skiing. Stakeholders are those with some knowledge about a particular topic. For example, if an author commonly cites skiing blogs, then the facility considers that author to have some authority on the topic, or meme, of skiing.

In some embodiments, the facility determines each author's authority for each meme on which the author writes by performing the following formula at predetermined time intervals. The current period is the time interval between a current application of the formula and the immediately preceding application of the formula. The formula establishes a positive relationship between an author's authority and whether the author publishes new articles or receives new citations during the current period, and a negative relationship between the author's authority and not publishing or receiving citations as follows: First, an author's authority for a particular meme during the current period starts with the author's authority for that meme from the previous period, such that an author's authority accumulates over time. Next, the facility increases an author's authority if the author posted any article on the meme during the current period. Then, the facility increases an author's authority for each stakeholder that cites during the current period an author's article on the particular meme, by an amount based on the authority of the stakeholder for the meme. In some embodiments, the facility also decreases an author's authority for each stakeholder that does not cite the author's articles on the meme during the current period. An author's authority develops over time as the author posts articles on the meme and as other authors cite the author's articles. In some embodiments, the facility uses a sigmoid function to normalize an author's authority within a bounded range, such as between zero and one.

In some embodiments, the facility determines a distinguished author's overall authority based on the author's authority across all memes over which the author writes articles. For example, the facility may calculate an average of the distinguished author's authority in each meme to determine an overall authority for the author. A distinguished author develops authority over time by writing on one or more topics. If the distinguished author writes on many topics, then the overall authority will be small, unless other authors regularly cite the distinguished author for each of the memes. For example, if the distinguished author commonly writes articles about skiing, cars, and sailing, but is only regularly cited on the topic of skiing, then the distinguished author's overall authority will be small. On the other hand, if the distinguished author only writes on a small number of topics, then citations on those topics will have a greater effect on the distinguished author's overall authority. For example, if the distinguished author only writes about skiing, and is regularly cited, then the distinguished author's overall authority will be large. Over time, a distinguished author's failure to create influence in some topic areas will not significantly affect the overall authority of the distinguished author if the distinguished author has a consistent pattern of posting influential articles in other topic areas.

In some embodiments, the facility determines the influence of an article within a blog based on the authority of other authors that have cited the article. For example, the facility may add up the authority of each other author citing the article to produce a score indicating the article's total influence. Alternatively, the facility may use other common methods for combining the authority of other authors that cite the article, such as by computing an average score or a weighted average score.

In some embodiments, the facility determines a blog's overall influence based on the influence of each of the articles posted to the blog. For example, the facility may calculate an average of the influence of each post to determine an overall average influence of an author's blog.

In some embodiments, the facility uses each of the measures described above to enable users to select among authors and blogs. For example, the facility may use author authority for a particular meme to rank authors for that meme, and to provide a potential reader with those authors that have the most authority for a meme. Similarly, the facility may use overall author authority to help a reader select the best authors when no particular meme is most relevant to the reader. The facility may use article influence to enable a reader to rank articles across authors that have been most influential on a particular topic. Likewise, the facility may use the overall influence of blogs to help a user select among blogs to find those that are the most influential. By using these measures to rank and recommend authors and blogs, the facility enables readers to identify high quality blog content.

FIG. 1 is a block diagram showing some of the components incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable storage medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
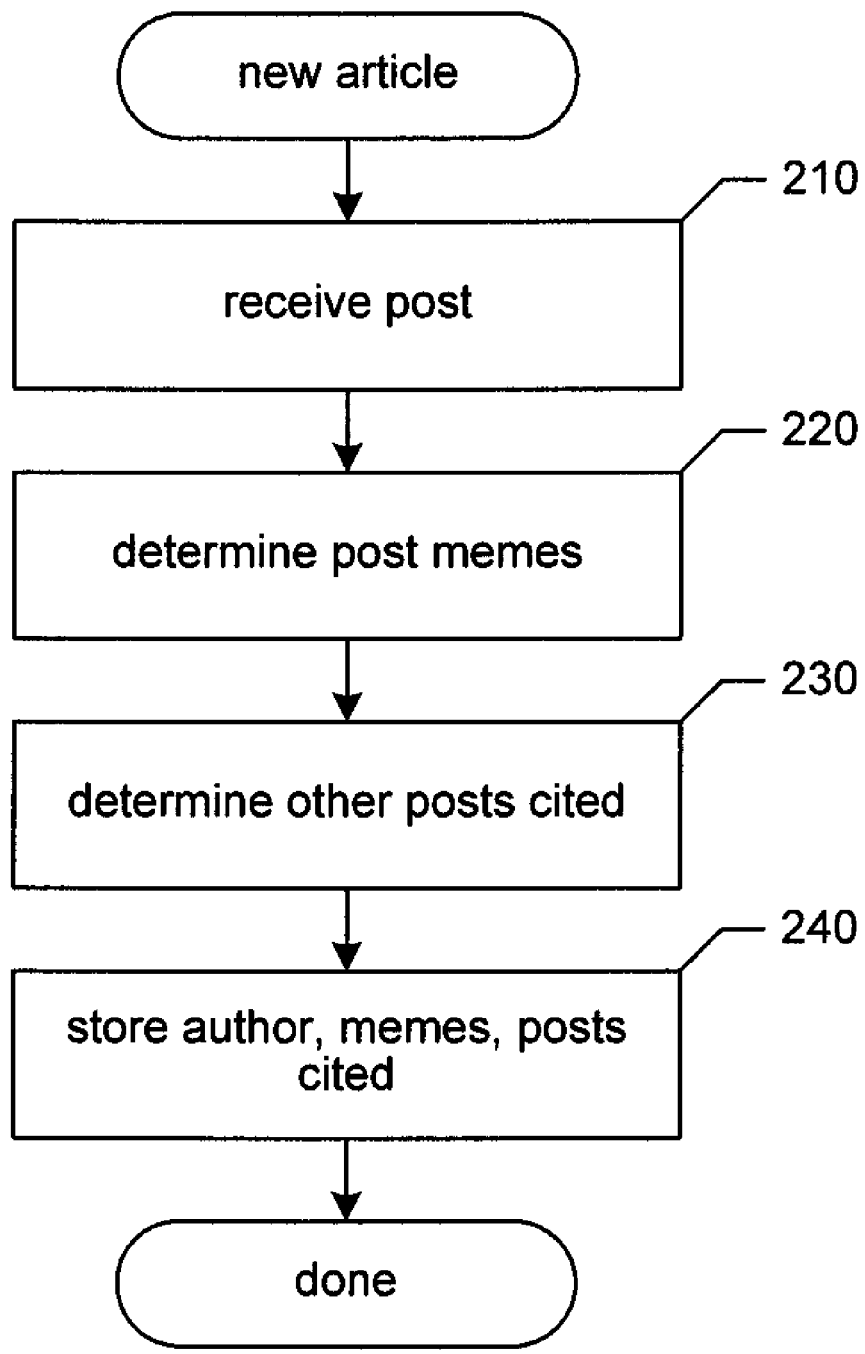
FIG. 2 is a flow diagram showing steps typically performed by the facility when an author posts a new article.

FIG. 2 is a flow diagram showing steps typically performed by the facility when an author posts a new article. In block 210, the facility receives the new post from the author. An author may post an article in a variety of ways, such as by publishing the article to a blog, sharing the article on a file server, or making the article available to other authors in other ways commonly known in the art. In block 220, the facility determines the memes contained within the posted article. In block 230, the facility determines other posts cited by the article. In block 240, the facility stores the author, memes, and posts cited for later use by the facility for determining author authority. After block 240, these steps conclude.

Figure 3A:
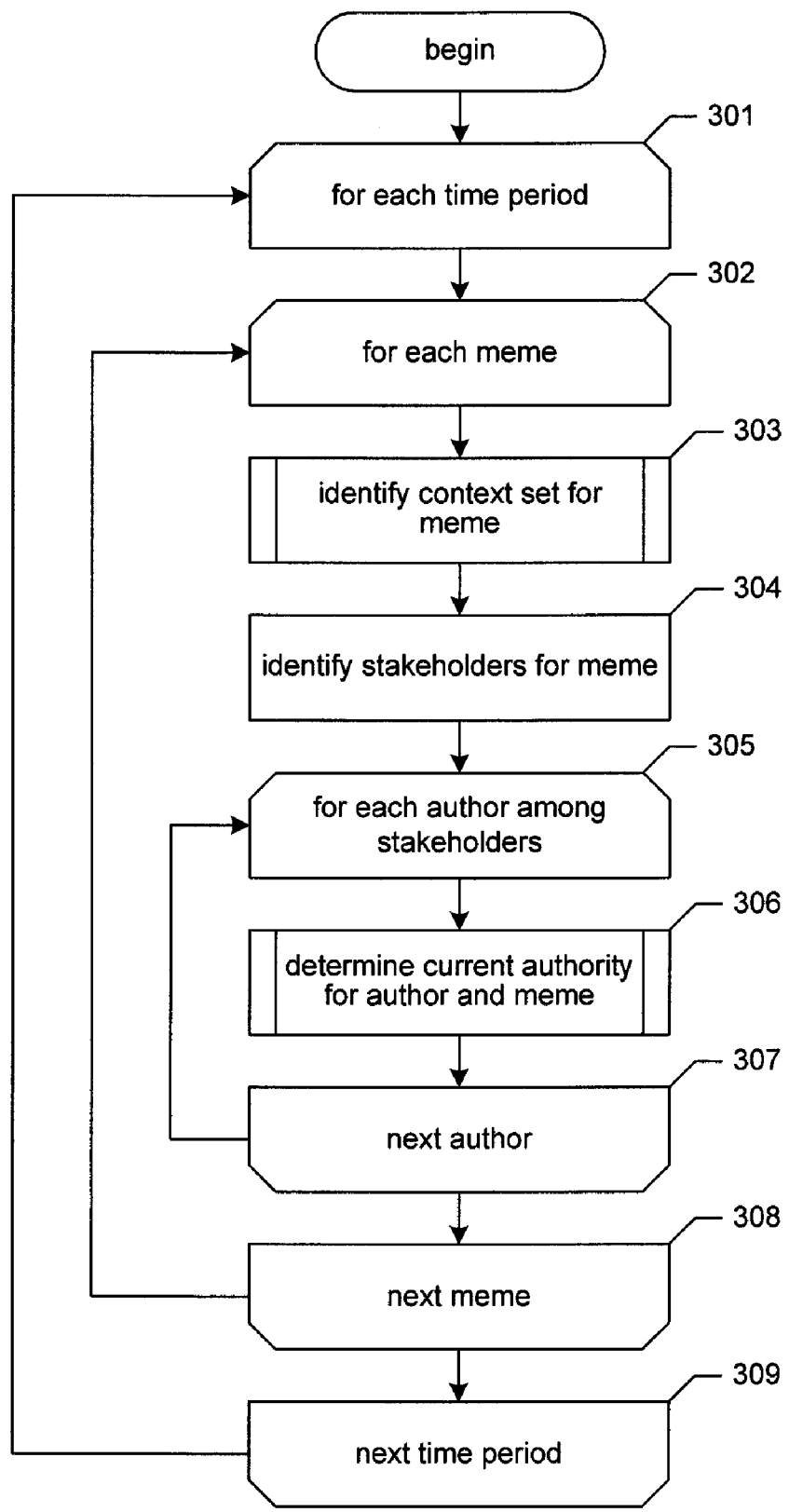
FIG. 3A is a flow diagram showing steps typically performed by the facility to periodically determine the per meme authorities of multiple authors.

FIG. 3A is a flow diagram showing steps typically performed by the facility to periodically determine the per meme authorities of multiple authors. In block 301, the facility begins executing a set of actions that are performed for each of a series of time periods. For example, the subsequent steps may be performed once per day. In step 302, the facility begins executing a set of actions that are performed for each meme tracked by the facility. In block 303, the facility identifies the context set that includes web pages with the same meme as the selected meme. In block 304, the facility identifies stakeholders, such as other authors that write about and cite articles covering the meme. In block 305, the facility begins executing a set of actions that are performed for each author among the stakeholders tracked by the facility. In step 306, the facility determines the current authority for the current author and meme, illustrated in further detail by FIG. 3B. In block 307, if there are additional authors the facility loops to block 305 to determine the current authority for the next author. In block 308, if there additional memes, the facility loops to block 302 to process the next meme tracked by the system. In block 309, the facility loops to block 301 to process the authority for memes and authors for the next time period. After block 309, these steps conclude.

Figure 3B:
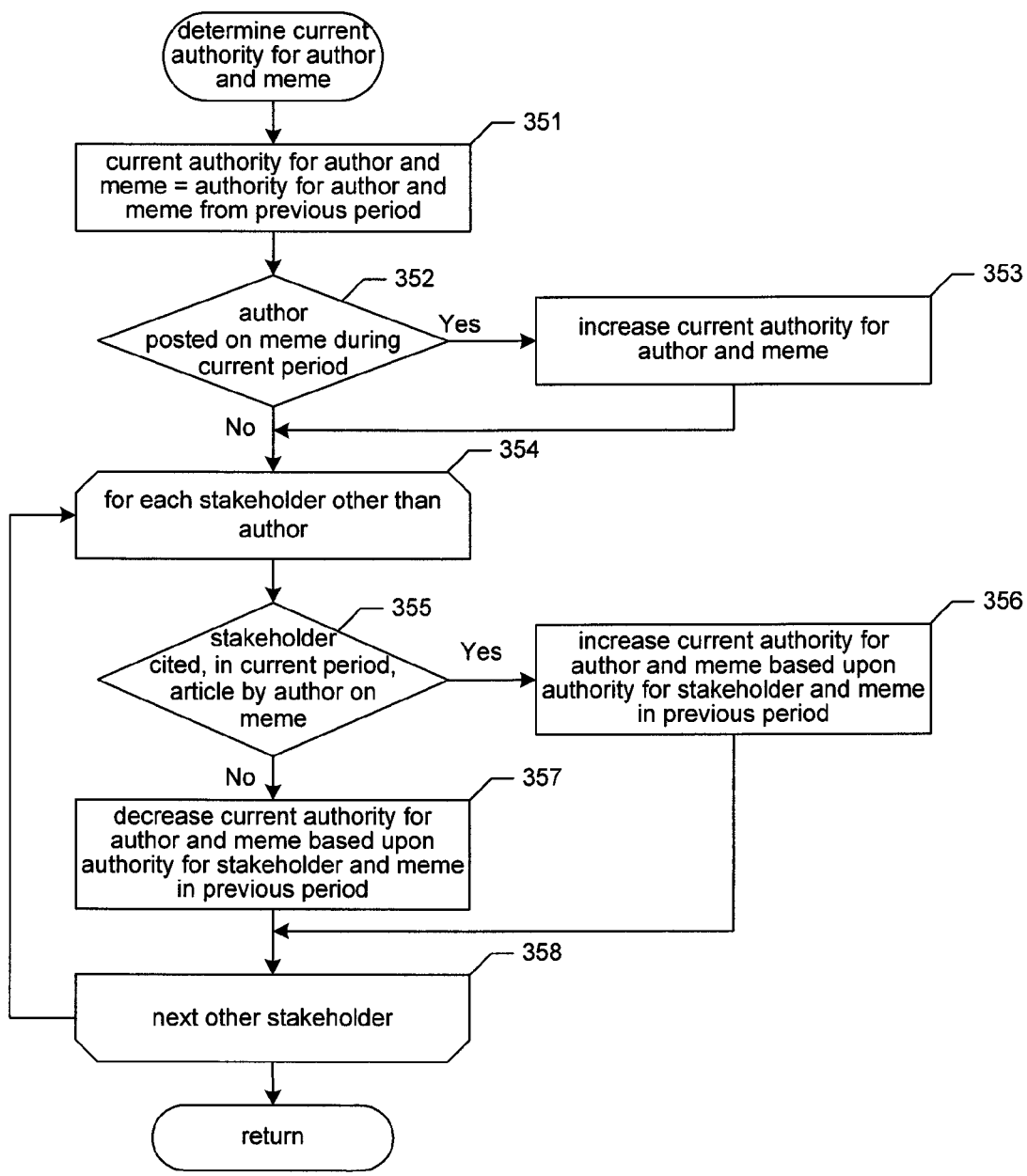
FIG. 3B is a flow diagram showing steps typically performed by the facility to determine the authority of a particular combination of author and meme.

FIG. 3B is a flow diagram showing steps typically performed by the facility to determine the authority of a particular combination of author and meme. In block 351, the facility begins determining the author's authority for the current meme for the current time period by starting with the author's authority for the current meme from the previous time period if there is one, or by setting the value to an initial value (e.g., zero) if this is the first period. In block 352, if the author posted an article on the selected meme during the current period, then the facility continues at block 353, else the facility continues at block 354. In block 353, the facility increases the author's authority (e.g., by incrementing the value by a determined amount). In block 354, the facility begins executing a set of steps for each stakeholder other than the author. In decision block 355, if the current stakeholder has cited during the current period one of the author's articles on the current meme, then the component continues at block 356, else the component continues at block 357. A stakeholder may cite an author in a variety of ways. For example, the stakeholder may place a link to the author's blog in the stakeholder's own blog. Alternatively, the stakeholder may leave a comment to the author's article on the author's blog. A trackback is another popular way of citing another author's article. Trackbacks work using a special protocol in which the citing author sends the original author a trackback ping, and the original author can then place a list of other author's citing their articles within their blog. In block 356, the facility increases the author's authority by an amount based on the authority of the stakeholder for the current meme, and then continues at block 358. In block 357, the facility decreases the author's authority based on the authority of the stakeholder for the current meme. In some embodiments, the component may skip or reduce the weight given to citations by stakeholders that the author has also cited to prevent feedback effects in which two authors cite each other's work to make each other look more authoritative on a topic. In block 358, if there are more stakeholders, then the component loops to block 354 to process any citations of the author by the next stakeholder. After all of the stakeholders are processed, these steps conclude.

As an example, assume that Author A's current authority for a particular meme is zero, the author posted in the current period, the author was cited by Stakeholder A having authority five during the current period, and the author was not cited by Stakeholder B having authority two during the current period. Author A's initial authority is zero. Author A's authority is incremented to one because Author A posted during the current period. Next, Author A's authority is increased by five (Stakeholder A's authority) to six for being cited by Stakeholder A. Finally, Author A's authority is decreased by two (Stakeholder B's authority) to four for failing to receive a citation from Stakeholder B.

One example of the steps performed by FIG. 3B is contained in the following formula:

$$A_i^k(t) = A_i^k(t-1) + \delta + \sum_j \eta A_j^k(t-1)$$

In this formula, i and j identify particular authors, k identifies a particular meme, t identifies the current time period, t−1 identifies the previous time period, δ identifies an amount by which the author's authority is increased when the author publishes, and η identifies a small positive weight if the stakeholder cites the post by author $A_i$ during the current period and identifies a small negative weight if the stakeholder does not cite the post during the current period. When i equals j, η is zero. The term $A_i^k(t-1)$ corresponds to step 351. The term δ corresponds to step 352. The term $\eta A_j^k(t-1)$ corresponds to step 355.

Figure 4:
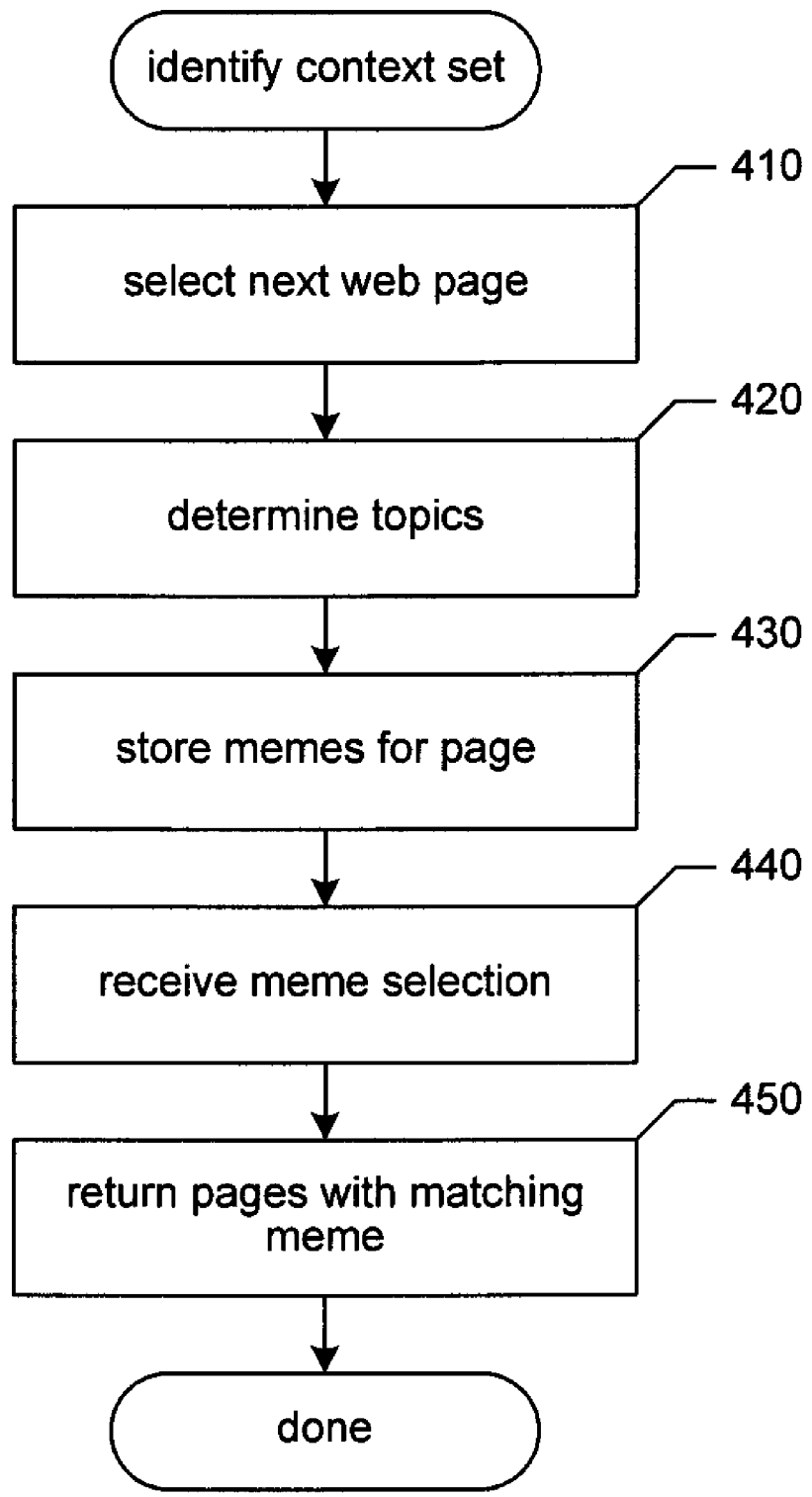
FIG. 4 is a flow diagram showing steps typically performed by the facility to identify the context set for a meme.

FIG. 4 is a flow diagram showing steps typically performed by the facility to identify the context set for a meme. The facility invokes the component to identify the context set related to a particular meme for a particular author. A context set contains other web pages that share similar topics with an author's web pages or blog articles. In block 410, the component selects the next web page. In block 420, the component determines the topics, or memes, associated with the selected web page. The facility may identify memes in several ways. For example, the facility may search web pages for keywords related to memes to identify those memes. The facility may use stop word removal to remove common words from an article such as "a" and "the" that do not contribute significantly to identifying article topics. The facility may use word stemming to include variations of words that are similar to the words found in an article to be matched with keywords. For example, the word "dietary" may lead to the related word "diet" being included in the search for matching keywords to identify memes. The facility may also compute a probability based on the frequency of each word in the corpus of the blog articles by an author as a way of determining those words that are the most common in the document. In some embodiments, the facility uses a method of determining the topics associated with a web page that identifies the keywords that users commonly use to search for the web page that is described in U.S. patent application Ser. No. 11/479,225, filed Jun. 30, 2006, entitled "Method and System for Associating Search Keywords with Interest Spaces," which is hereby incorporated by reference. In block 430, the memes found on the selected web page are stored for later use. In block 440, the component receives a meme selection for which similar web pages are to be found. In block 450, the component returns those web pages that have matching memes. In some embodiments, the component may perform the processing of blocks 410-430 from that of blocks 440-450 at certain predefined intervals to maintain an index of web pages and their topics. After block 450, these steps conclude.

Figure 5:
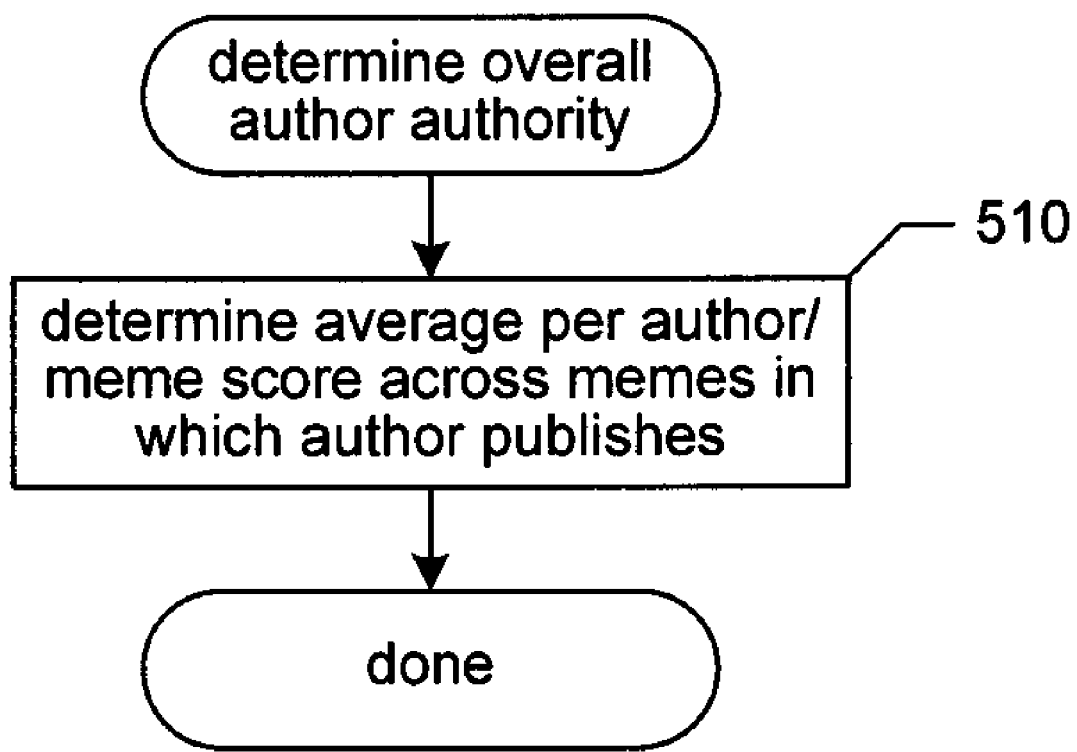
FIG. 5 is a flow diagram showing steps typically performed by the facility to determine the overall authority for an author.

FIG. 5 is a flow diagram showing steps typically performed by the facility to determine the overall authority for an author. The facility invokes the component to determine an author's overall authority across all memes on which the author writes articles. In block 510, the component determines an average score for the author based on the author's score for each particular meme on which the author writes articles. An author may write on many topics, in which case the author will have to have high authority in each topic area to have a high overall authority. On the other hand, swings in authority for any topic area for which the author writes articles will have a greater effect on an author who writes in relatively few topic areas. After block 510, these steps conclude.

Figure 6:
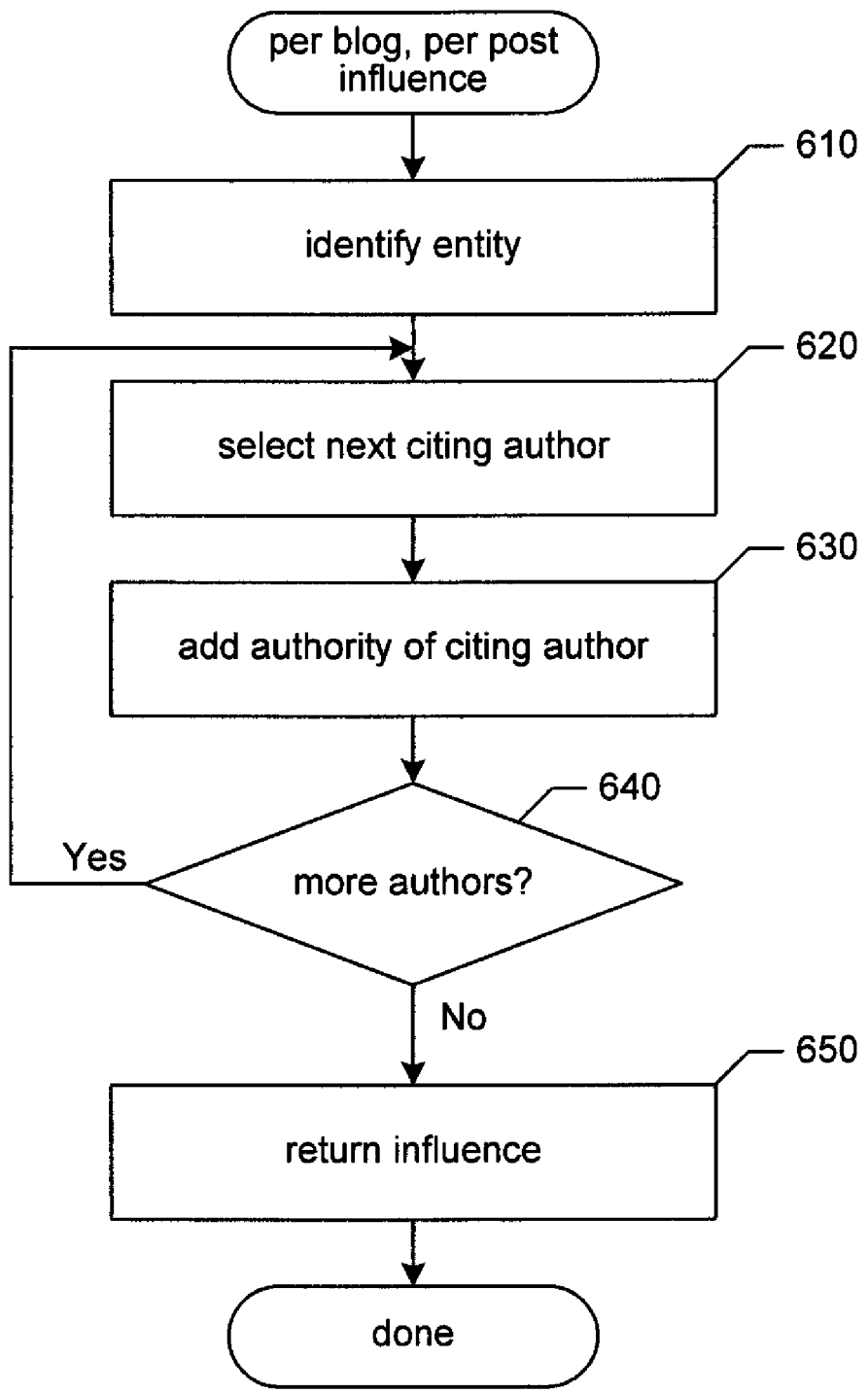
FIG. 6 is a flow diagram showing steps typically performed by the facility to determine the influence of a post by an author.

FIG. 6 is a flow diagram showing steps typically performed by the facility to determine the influence of a post by an author. The facility invokes the component to determine the influence of a particular post on an author's blog. In block 610, the component begins determining the post influence by identifying a new entry, or post, to the author's blog. In block 620, the component selects the next author that has cited the entry. In block 630, the component combines (e.g., by adding the value) the authority of the author citing the blog entry with the entry's influence score. In decision block 640, if there are more authors that have cited the entry, then the component loops to block 620 to select the next author, else the component continues at block 650. In block 650, the component returns the post influence as the combined authority of each author that cited the entry. After block 650, these steps conclude.

Figure 7:
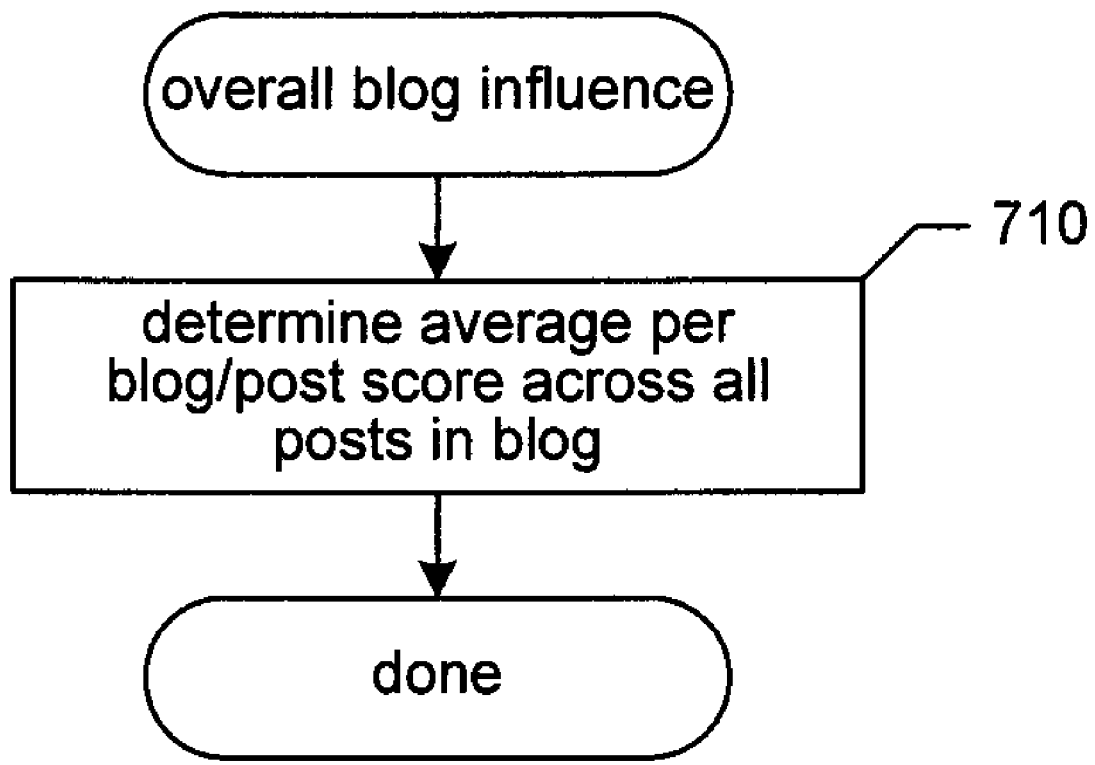
FIG. 7 is a flow diagram showing steps typically performed by the facility to determine the overall influence of an author's blog.

FIG. 7 is a flow diagram showing steps typically performed by the facility to determine the overall influence of an author's blog. In block 710, the component determines an average influence score for the blog based on the influence attributed to each post made to the blog. A blog with many posts of which only a few are influential will have a lower overall influence score than a blog with only a few posts that are very influential. After block 710, these steps conclude.

Figure 8:
FIG. 8 is a table illustrating the posting frequency of four example authors in one embodiment.
Figure 10:
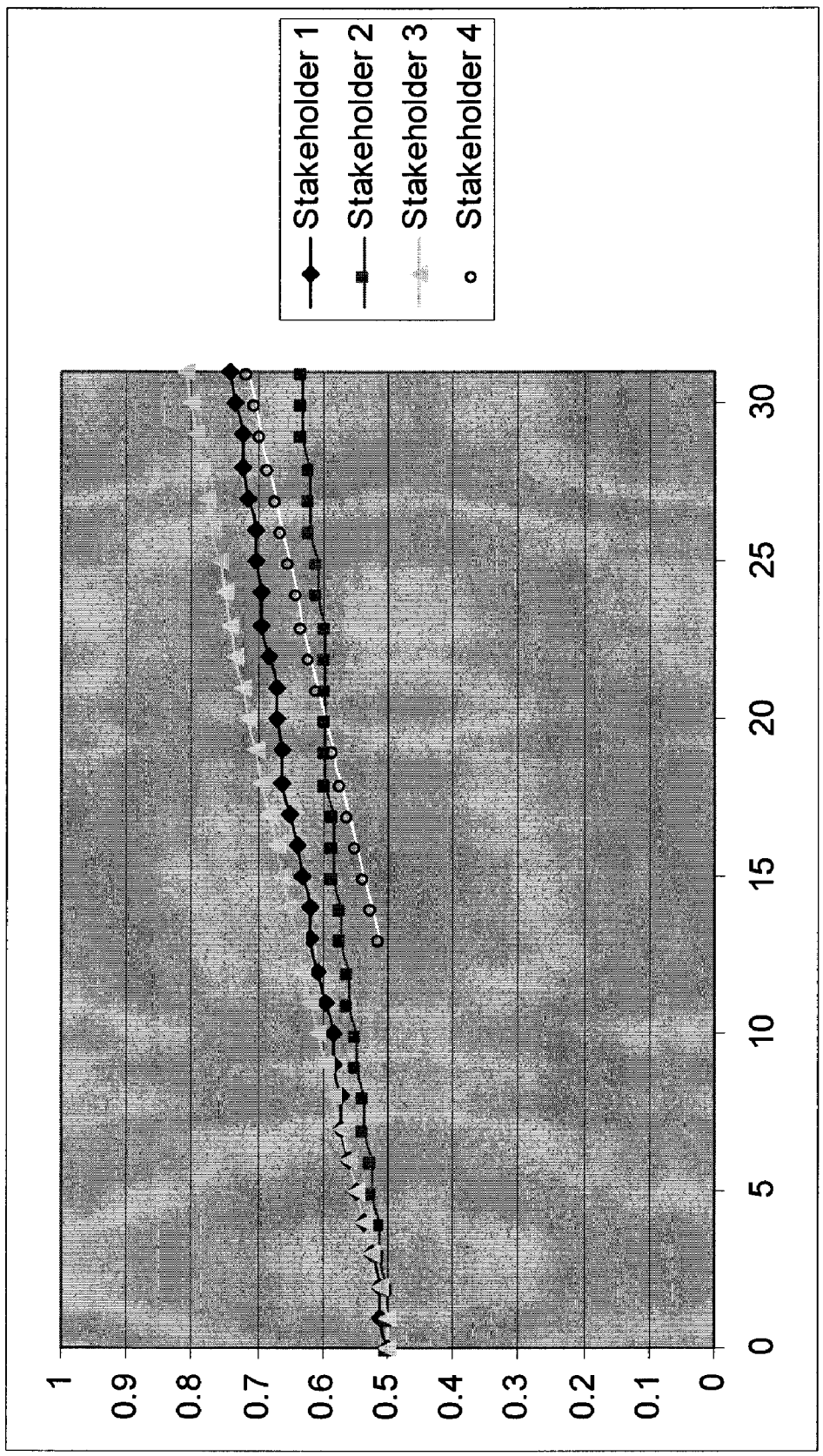
FIG. 10 is a graph illustrating the authority of each of four example authors over time when the facility considers only posts by each author.
Figure 11:
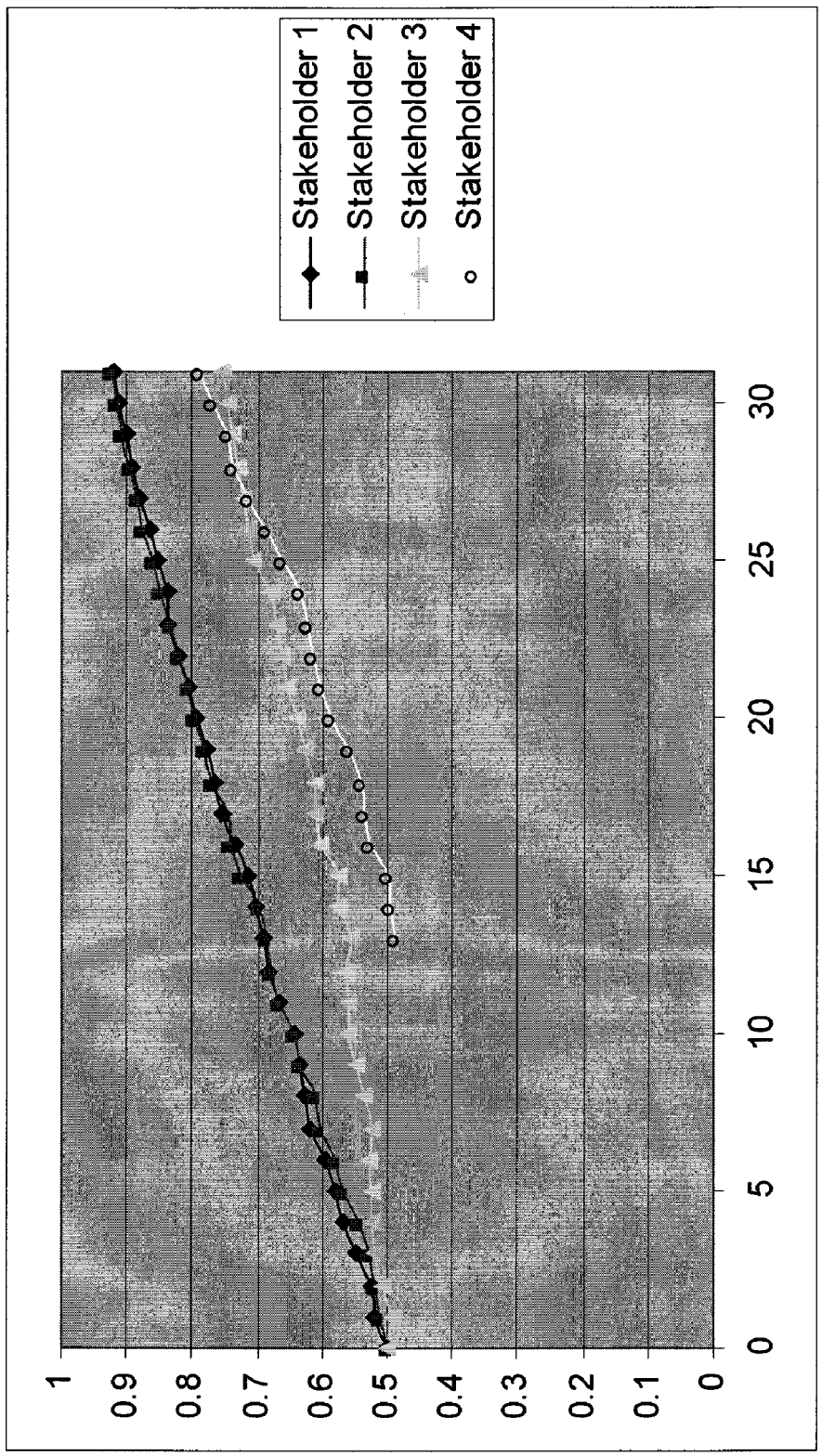
FIG. 11 is a graph illustrating the authority of each of four example authors over time when citations are included.
Figure 12:
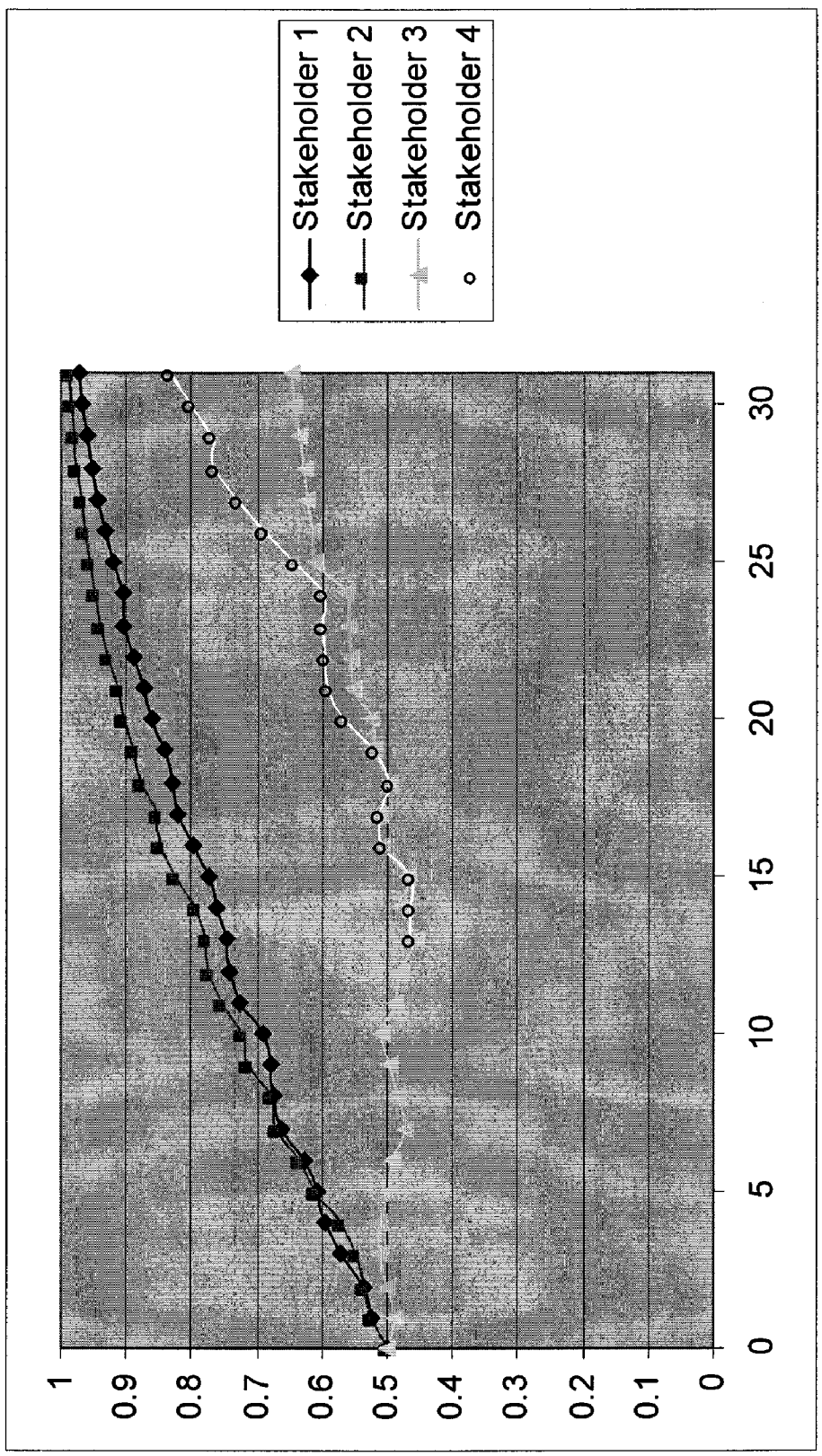
FIG. 12 is a graph illustrating the authority of each of four example authors over time when citation by other authors is weighted higher than posting frequency.

To illustrate the behavior of determining an author's authority for a particular meme based on the techniques described above, FIGS. 8-12 consider four stakeholders writing on the meme, each with a different writing frequency and authority. These figures illustrate the results that occur when the same data is subjected to various embodiments of the facility. FIG. 8 illustrates the posting frequency of the four stakeholders. FIG. 9 illustrates the effect of the authors citing one another. FIG. 10 illustrates the effect of posting on an author's authority. FIG. 11 illustrates the effect of receiving citations on an authors authority. FIG. 12 illustrates the effect on an author's authority of weighting receiving citations higher than frequency of posts made by the author.

FIG. 8 is a table illustrating the posting frequency of four example authors in one embodiment. Each row of the table represents a different unit of time (e.g., a day), and each column represents a different author. A value of one in a cell indicates that the author posted on that day, and a value of zero indicates that the author did not post on that day. Stakeholder 1, represented by column 830, is a frequent author that writes nearly every day. Stakeholder 2, represented by column 820, writes less frequently but when he does write his articles tend to be very influential. Stakeholder 3, represented by column 810, writes nearly every day, but his articles are not very influential. Stakeholder 4, represented by column 840, begins writing much later than the other stakeholders begin, and writes every day once she starts.

FIG. 9 is a table illustrating the effect of one author citing another for four example authors. Each row of the table represents a different unit of time (e.g., a day), and each column represents the citing relationship of two authors. For example, column A12 relates to whether stakeholder 1 cited stakeholder 2 for a given day. For a given column, a value of 1 in a cell indicates that the first stakeholder listed in the column heading (e.g., stakeholder 1 in column A12) cited the second stakeholder listed in the column heading (e.g., stakeholder 2 in column A12) on a given day, a value of −1 indicates that the second stakeholder posted but was not cited by the first stakeholder, and a value of zero indicates that the second stakeholder did not post on the given day. Stakeholder 1 is a careful researcher, and cites several sources in each blog article. Stakeholder 2, although a less frequent writer, is often cited by stakeholder 1, and is always cited by stakeholders 3 and 4. For example, columns A32 and A42 contain all ones, indicating that stakeholders 3 and 4 always cite stakeholder 2's articles. Stakeholder 2's authority is reflected in this citation frequency. Conversely, stakeholder 2 uses source data, and in fact does not frequently cite other stakeholders, occasionally citing stakeholder 1. For example, columns A21, A23, and A24 contain mostly values of zero or −1 reflecting stakeholder 2's infrequent citations of other stakeholders. Stakeholder 3 wishes to gain the attention of the other stakeholders, so he cites each of them in every post, hoping that they will do the same. However, stakeholder 3 is only infrequently cited by stakeholder 1 and almost never by stakeholder 2. Finally, stakeholder 4 enters the group halfway through the simulation, and like stakeholder 3, writes everyday, and cites each of the other stakeholders. Stakeholder 1 infrequently cites stakeholder 4, stakeholder 2 almost never cites stakeholder 4, and stakeholder 3 frequently cites stakeholder 4, but only after a delay.

FIG. 10 is a graph illustrating the authority of each of four example authors over time when the facility considers only posts by each author. The graph illustrates the authority of each stakeholder after 31 days of posts. The impact of the authors' citations of one another is set to zero. As a result, all authors approach the same authority, which is purely a function of the number of posts made by each author. Stakeholder 2, who posts less frequently, has the lowest authority. Even stakeholder 4, who starts posting much later than the other stakeholders, has a higher authority because of posting more frequently.

FIG. 11 is a graph illustrating the authority of each of four example authors over time when citations are included. As shown by the graph, stakeholders 1 and 2 quickly reinforce each other by citing one another. For example, after 5 days, stakeholders 1 and 2 have nearly equal authority which is greater that that of other stakeholders. Stakeholder 2, who posts at half the frequency of stakeholder 1, nonetheless has the same authority. Stakeholder 3, however, posts each day but receives few citations from stakeholders 1 and 2 who have high authority. As a result, stakeholder 3 has much lower authority until stakeholder 4 begins posting and citing stakeholder 3. For example, after 10 days stakeholder 3 has a relatively flat authority, but after day 20 stakeholder 3's authority is climbing steadily due to citations by stakeholder 4. Stakeholder 4, who started later than stakeholder 3 and posts at $\frac{2}{3}^{rds}$ of the frequency, nevertheless has a higher authority because of the citations received from the other stakeholders. For example, after 25 days stakeholder 4's authority surpasses that of stakeholder 3.

FIG. 12 is a graph illustrating the authority of each of four example authors over time when citation by other authors is weighted higher than posting frequency. Stakeholder 3, despite daily posts, actually has a decreasing authority before stakeholder 4 arrives and begins citing him. This is a result of the fact that the very authoritative authors 1 and 2 largely ignore him. FIG. 12 also illustrates that even authors that start posting later, such as stakeholder 4, can become authorities as long as they get some recognition by the accepted authorities, such as stakeholders 1 and 2. In addition, stakeholder 4's rising authority ultimately pulls stakeholder 3's authority up.

From the foregoing, those skilled in the art will appreciate that specific embodiments of the facility system have been described herein for purposes of illustration, but that various modifications may be made without deviating from the spirit and scope of the invention. For example, although the determination of author authority and article influence have been described in the context of blogs, the techniques presented apply equally well to other forms of online publications such as product reviews. Accordingly, the invention is not limited except as by the appended claims.

We claim:

1. A method in a computer system for adjusting an author authority measure of a distinguished author on a topic for a current period that is preceded by earlier periods, comprising the steps of:

identifying articles posted by the distinguished author on the topic during the current and earlier periods;

identifying stakeholder authors that cited or posted articles on the topic during the current or earlier periods;

for each identified stakeholder author, determining in the computer system whether the stakeholder author cites during the current period an identified article posted by the distinguished author;

adjusting in the computing system the author authority measure of the distinguished author on the topic based at least upon whether the stakeholder author cites during the current period an identified article posted by the distinguished author and whether the distinguished author published an article during the earlier period;

before adjusting the author authority measure for the current period, initializing the author authority measure for the current period based at least upon the author authority measure for the latest earlier period; and if the distinguished author has published on the topic during the current period, adjusting the author authority measure to reflect an increase in authority;

wherein adjusting the author authority measure of the distinguished author on the topic based at least upon whether the stakeholder cites during the current period an identified article posted by the distinguished author for each author identified as a stakeholder includes increasing the author's authority measure if the stakeholder cites during the current period an identified article and decreasing the author's authority measure if the stakeholder does not cite during the current period the identified article.

2. The method of claim 1 wherein the identifying articles posted by the distinguished author on the topic comprises searching for keywords within each article posted by the author.

3. The method of claim 2 wherein the searching includes stop word removal or word stemming.

4. The method of claim 2 wherein the searching includes computing word probability in a corpus containing the article.

5. The method of claim 1 wherein the identifying articles posted by the distinguished author on the topic comprises identifying articles based at least upon keywords used in searches for the articles.

6. The method of claim 1 wherein the adjusting includes increasing the distinguished author's authority measure if the stakeholder author cites during at least one of the current period and the previous period an identified article.

7. The method of claim 1 wherein the adjusting includes decreasing the distinguished author's authority measure if the stakeholder author does not cite during at least one of the current period and the previous period an identified article.

8. The method of claim 1 wherein the determining whether the stakeholder author cites during the current period an identified article includes identifying trackbacks to the identified article.

9. The method of claim 1 wherein the determining whether the stakeholder author cites during the current period an identified article includes identifying links to the identified article.

10. The method of claim 1 including computing an author's average authority based at least upon the author's authority measure across each topic on which the author posts articles.

11. The method of claim 1 including ranking a search result based at least upon the adjusted author authority.

12. The method of claim 1 including limiting the author authority measure to a predefined range by applying a sigmoid function.

13. A computer-readable storage medium containing instructions for controlling a computer system to adjust the influence of a first author on a topic, by a method comprising:
 identifying articles posted by the first author on the topic during a current period and an earlier period;
 identifying other authors that cited or posted articles on the topic during the current or earlier periods;
 for each of the other authors,
 determining the authority of each of the other authors based on whether the other authors cite during the current period an identified article posted by the first author; and
 adjusting the influence of the first author on the topic based at least upon the determined authority of each of the other authors that cites during the current period an identified article posted by the first author, and whether the first author published an article during the earlier period;
 before adjusting the influence for the current period of the first author's post of the identified article, initializing the influence for the current time period based on the influence for the latest earlier period; and
 adjusting the influence to reflect an increase in authority if the first author has published on the topic during the current period;
 wherein adjusting the influence of the first author on the topic based at least upon whether the other authors cite during the current period an identified article posted by the first author for each author identified as the other authors includes increasing the influence if the other authors cite during the current period the identified article and decreasing the influence if the other authors do not cite the identified article during the current period.

14. The computer-readable storage medium of claim 13 including ranking a search result based on the determined post influence.

15. The computer-readable storage medium of claim 13 including determining other authors that did not cite the post, and for each determined other author that did not cite the post, decreasing the post influence based at least upon the authority of the other author that did not cite the post.

16. The computer-readable storage medium of claim 13 wherein determining whether an author cited a post includes identifying trackbacks to the post.

17. The computer-readable storage medium of claim 13 wherein determining whether an author cited a post includes identifying links to the post.

18. A system for searching for relevant content on a topic, comprising:
 a computer system that includes central processing unit; and a memory;
 logic executed on the computer system that identifies articles that satisfy a search query, the articles posted by a plurality of authors on the topic and published in a current period and an earlier period;
 logic executed on the computer system that identifies stakeholder authors that cited or posted articles on the topic during the current or earlier periods;
 logic executed on the computer system that identifies an authority of the plurality of authors of the identified articles, the authority based at least upon whether the stakeholder authors cite the identified articles in the current period and whether respective authors of the articles published at least one previous article on the topic satisfying the search query in a previous period, the logic further comprising logic that,
 before identifying the authority of the plurality of authors for the current period, initializes the authority for an author for the current period based at least upon the authority of the author for a latest earlier period;
 if the author has published the at least one previous article on the topic satisfying the search query in the current period, increasing the authority;
 wherein for each of the identified stakeholder authors, the authority of the author is further increased if the stakeholder author cites during the current period an identified article associated with the author, the authority of the author decreased if the stakeholder author does not cite during the current period the identified article associated with the author; and
 logic executed on the computer system that ranks the identified articles based on the authority of the author of each of the identified articles.

19. The system of claim 18 further comprising logic executed on the computer system that returns search results in an order based on the ranking of the identified articles.

20. The system of claim 18 logic executed on the computer system that receives the search query.

21. A method in a computer system for adjusting an authority measure of an author on a topic, comprising the steps of:

identifying a quantity of articles posted by a distinguished author on the topic during a current time period, the current time period being a time interval between a present determination of the authority measure and a previous determination of the authority measure;

identifying at least one stakeholder, the at least one stakeholder being a person with knowledge of the topic;

determining in the computer system whether the at least one stakeholder cites at least one of the identified articles during the current time period; and calculating in the computer system present determination of the authority measure by adding to the previous determination of the authority measure a first amount by which an authority measure increases based upon the quantity of identified articles, adding a second amount by which the authority measure increases based at least upon a quantity of citations by the at least one stakeholder during the current time period, and subtracting a third amount by which the authority measure decreases based upon a quantity of stakeholders that do not cite an identified article.

22. The method of claim 21, wherein the step of calculating the present determination of the authority measure further comprises the equation:

$$A_i^k(t) = A_i^k(t-1) + \delta + \sum_j \eta A_j^k(t-1)$$

wherein $A_i^k(t)$ identifies the present determination of the authority measure of the distinguished author i on the topic k, $A_i^k(t-1)$ identifies the previous determination of the authority measure, $\delta$ identifies the first amount by which the authority measure increases based upon the quantity of identified articles, and $$\sum_j \eta A_j^k(t-1)$$

identifies a summation of the second amount and the third amount based upon each of the stakeholders j, wherein $\eta$ identifies a positive weight corresponding to a citation by the at least one stakeholder and a negative weight corresponding to an absence of a citation by the at least one stakeholder, and $A_j^k(t-1)$ identifies a stakeholder authority measure.

* * * * *